United States Patent [19]

Rumble

[11] 4,138,146

[45] Feb. 6, 1979

[54] PIPE COUPLING WITH A WEDGING CONTRACTIBLE RING

[75] Inventor: Edgar B. Rumble, Girard, Ohio

[73] Assignee: Michigan Pipe Fittings Company, Hubbard, Ohio

[21] Appl. No.: 832,949

[22] Filed: Sep. 13, 1977

Related U.S. Application Data

[63] Continuation of Ser. No. 696,508, Jun. 16, 1976, abandoned.

[51] Int. Cl.² .......................................... F16L 35/00
[52] U.S. Cl. ................................. 285/39; 285/308; 285/321; 285/369
[58] Field of Search ................. 285/39, 308, 315, 364, 285/321, 104, DIG. 7; 403/326, DIG. 6

[56] References Cited

U.S. PATENT DOCUMENTS

| | | | |
|---|---|---|---|
| 2,182,797 | 12/1939 | Dillon | 285/308 |
| 2,225,610 | 12/1940 | Christian | 285/315 X |
| 2,479,960 | 8/1949 | Osborn | 285/315 X |
| 2,939,728 | 6/1960 | Bitel | 285/315 |
| 3,362,730 | 1/1968 | St. Clair et al. | 285/369 X |
| 3,929,355 | 12/1975 | Sljusar | 285/308 |

FOREIGN PATENT DOCUMENTS

| | | | |
|---|---|---|---|
| 527763 | 7/1956 | Canada | 285/308 |
| 2258950 | 3/1974 | Fed. Rep. of Germany | 285/321 |
| 932001 | 7/1963 | United Kingdom | 285/321 |

*Primary Examiner*—Dave W. Arola
*Attorney, Agent, or Firm*—Shoemaker and Mattare, Ltd.

[57] ABSTRACT

A pipe coupling for releasably securing pipe in end to end relation uses controlled wedging action of contractile rings positioned between the coupling and the ends of the pipes. The pipes are disengagable from the coupling by manually moving the pipes inwardly of the coupling and then inserting a thin half circular sleeve tool between the pipes and the contractile rings so as to reposition the contractile rings away from the pipes.

6 Claims, 4 Drawing Figures

PIPE COUPLING WITH A WEDGING CONTRACTIBLE RING

This is a continuation of patent application Ser. No. 696,508, filed June 16, 1976, now abandoned.

BACKGROUND OF THE INVENTION

1. Field of the Invention

This invention relates to pipe couplings for connecting two pipe sections to one another.

2. Description of the Prior Art

Prior structures of this type have employed various arrangements of contractile rings, split locking rings and movable resilient rings and the like. See for example U.S. Pat. Nos. 3,151,891, 2,950,132, 3,027,179 and 3,600,010. Still other arrangements of resilient locking and sealing rings may be seen in U.S. Pat. Nos. 2,991,091 and 3,534,776.

This invention eliminates the problems which have existed in the prior art devices and specifically with respect to the inability of the distortable or compressible sealing and locking rings to retain a coupling in secured position under working pressures and the like.

The present invention also eliminates the problems with the split metal contractible rings of the prior art devices which were difficult to operate particularly in releasing the pipe from the coupling.

SUMMARY OF THE INVENTION

A pipe coupling with a controlled wedging action contractible ring takes the form of a coupling adapted to receive the ends of sections of pipe therein to join the same to one another and has annular grooves inwardly from the ends of the coupling defining circumferentially tapered channels in which contractible rings are disposed and arranged so that forces tending to separate the pipes and the couplings will move the contractible rings axially along the tapered surface of the channels in the coupling into locking engagement with grooves around the pipe sections. Moving the pipe sections inwardly of the opposite ends of the coupling and inserting tools between the pipe sections and the coupling and engaging the contractible rings in the areas of the circumferentially tapered channels causes the contractible rings to be expanded therein sufficiently to permit the pipe sections to be withdrawn from the coupling.

DESCRIPTION OF THE PREFERRED EMBODIMENT

Figure 1:
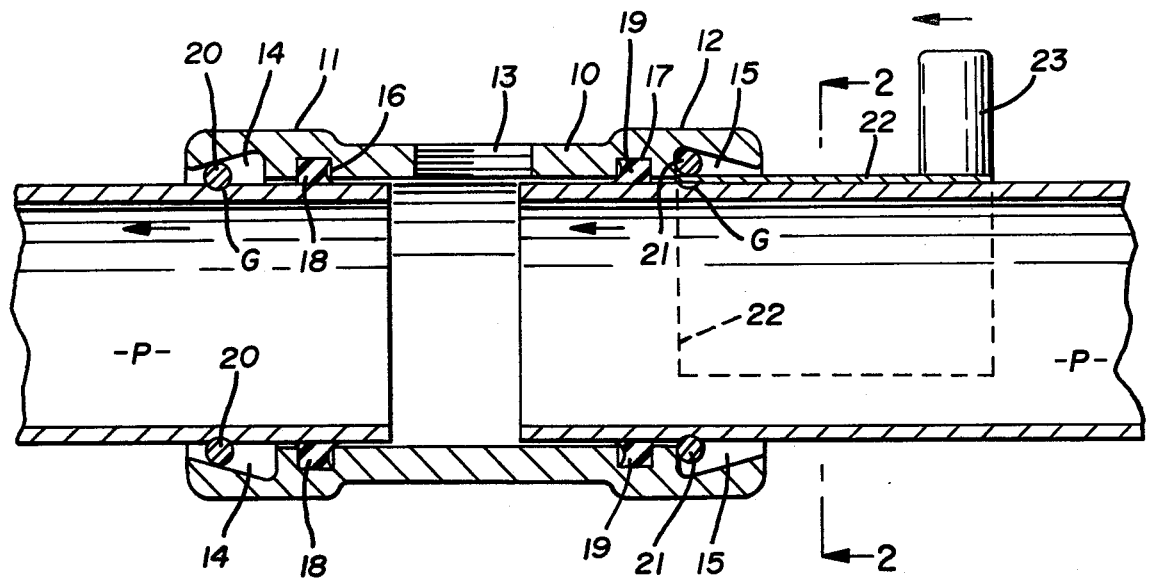
FIG. 1 is a longitudinal cross section of a pipe coupling with sections of pipes engaged therein showing in the left hand side the contractible rings in locked position and in the right hand side the contractible rings moved to unlocked position by a tool.

Two forms of the invention are disclosed herein and by referring to FIG. 1 of the drawings one of the forms may be seen to include a coupling body member 10 which is tubular with the end portions 11 and 12 thereof of slightly increased outer diameter. A threaded opening 13 may be formed inwardly of the ends of the coupling so that a fluid conducting member may be positioned therein as will be understood by those skilled in the art.

Circumferentially tapered channels 14 and 15 are formed inwardly of the ends of the coupling body member 10 and annular channels 16 and 17 are formed inwardly of the circumferentially tapered channels and are adapted to receive and retain sealing gaskets 18 and 19 respectively.

In FIG. 1 of the drawings a pair of pipe sections P are shown extending into the coupling body member 10 and each of the sections of pipe P are provided with annular grooves G in which a pair of contractible, non-compressible metal rings 20 and 21 are normally disposed as seen in the left end portion of FIG. 1 of the drawings. It will be observed that fluid pressure in the coupling and the pipes P will tend to urge the pipes P outwardly of the ends of the coupling body member 10 and thereby cause the contractible rings 20 to move into the smaller areas of the circumferentially tapered channels 14 and 15 and thus securely lock the pipe sections P into the coupling body member 10. The contractible rings 20 and 21 are circular in shape and preferably round in cross section and they are split so that they may be expanded circumferentially so as to be moved into the larger areas of the circumferentially tapered channels 14 and 15 as hereinafter described in order that the pipe sections P may be released from the coupling body member 10 when desired.

It will thus be seen that in locked position as seen in the left hand portion of FIG. 1 the contractible split ring 20 is normally engaged in the external circumferential groove G in the pipe section P and wedged into the circumferentially tapered channel 14 which defines a frusto-conical bottom.

So that the pipe sections P can be released from the coupling body member 10 if and when desired, it is necessary to move the pipe sections P inwardly of the coupling as seen in the right hand end of FIG. 1 of the drawings. In this portion of FIG. 1 the contractible non-compressible metal ring 21 is shown partially disengaged from the circumferential groove G in the pipe sections P by the action of moving the pipe section P inwardly by the end of the coupling to the left in FIG. 1 and simultaneously inserting a tool taking the form of a thin sleeve 22 which sleeve defines about three-quarters of a circle and is provided with a perpendicular handle 23. The circumference of the thin sleeve 22 is comparable with the exterior circumference of the pipe sections P so that it can be positioned thereon and slid inwardly of the end of the coupling body member 10 and into the circumferentially tapered channel 15 so that its innermost end will engage between the contractible ring 21 and the outer surface of the pipe section P and move it sufficiently and through a sufficient area thereof to substantially disengage the circumferential groove G whereupon the section of pipe P may be pulled outwardly of the coupling body member 10.

Figure 2:
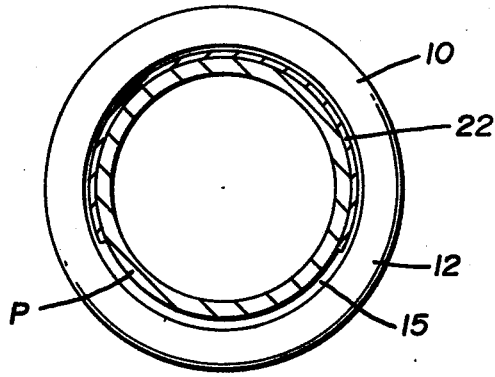
FIG. 2 is a vertical section on line 2—2 of FIG. 1.

In FIG. 2 of the drawings, the cross section of the thin sleeve 22 clearly indicates its relatively small thickness and its ability to slide into the area between the exterior surface of the pipe sections P and the inner surface of the coupling body member 10 and into the circumferential tapered channel 15.

It will occur to those skilled in the art that when the contractible ring 21 is seated in the circumferential groove G formed in the pipe P, pressure forces within the coupling and the pipe results in the shear loading of the contractible ring and it is therefore necessary that the material of the ring be functionally incompressible such as a suitable metal or a very hard plastic material.

Modifications in the tool necessary to move the contractible ring of the coupling into substantially disengaged relation to permit the pipe sections to be withdrawn from the coupling will occur to those skilled in the art and one such modification is illustrated and described in connection with FIGS. 3 and 4 of the drawings.

Figure 3:
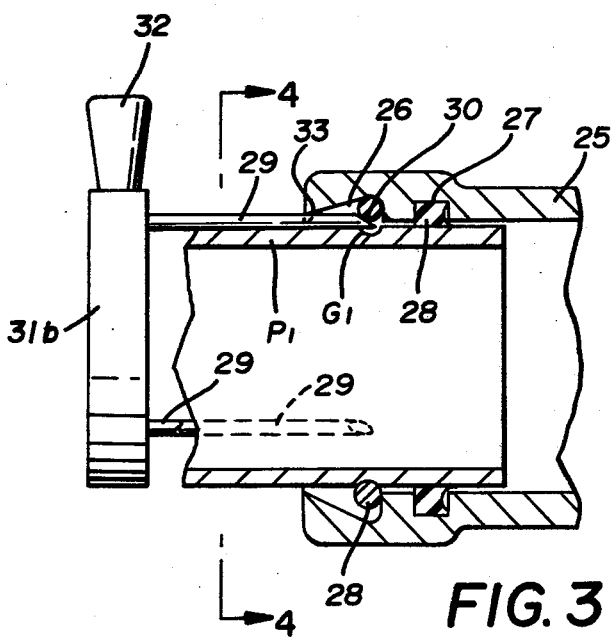
FIG. 3 is a longitudinal cross section of a portion of a pipe coupling showing a modified configuration and tool for disengaging a contractile ring from a pipe in the coupling.
Figure 4:
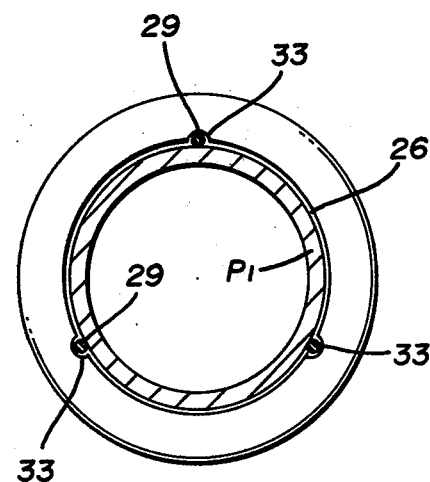
FIG. 4 is a vertical section on line 4—4 of FIG. 3.

By referring now to FIG. 3 of the drawings, it will be seen that a coupling body member 25 is partially illustrated, one end thereof being shown, and that it is provided with a circumferentially tapered channel 26 within its open end and a secondary annular channel 27 in which a sealing gasket 28 is located. A section of pipe P1 is provided with a circumferential groove G1 thereabout and is illustrated in position in the coupling body member 25. A contractible ring 28 is shown substantially disengaged from the circumferential groove G1 by the action of a plurality of shim-like elongated members 29, the outermost ends of which are tapered as at 30. These elongated members 29 are mounted on an arcuate body 31 which in turn is provided with a perpendicular handle 32, the body 31 being arranged so that it may be distorted sufficiently to be positioned over the section of pipe P1 and moved into engagement with matching longitudinally extending grooves 33 formed in circumferentially spaced relation in the end of the coupling body member 25, the inner ends of the grooves 33 communicating with the circumferentially tapered channel 26. The circumferential spacing of the grooves 33 may be seen in FIG. 4 of the drawings and in FIG. 4 cross sections of the elongated members 29 are seen in position therein. The operation of the tool with the elongated members 29 thereon is similar to that of the thin sleeve 22 in the embodiment of the invention hereinbefore described in that in order to disengage the contractible ring 28 from the circumferential groove G1 in the pipe P1 the pipe is moved inwardly of the coupling as seen in FIG. 3 of the drawings while the tool including the elongated members is inserted by way of the grooves 33 whereby its pointed inner ends 30 will move the contractible ring 28 outwardly of the groove G1 over a sufficient area of the pipe P1 to permit the pipe to be withdrawn from the coupling.

It will thus be seen that a pipe coupling has been disclosed which may be relatively easily and inexpensively formed and more importantly easily assembled to join pipe sections which are modified only by the formation of the circumferential grooves in their outer surfaces near their ends. The resulting coupling is capable of distortion and remains sealed and fluid tight under varying pressure conditions and is particularly suitable for use in the formation of fire extinguishing sprinkler systems and the like.

Although but two embodiments of the present invention have been illustrated and described, it will be apparent to those skilled in the art that various changes and modifications may be made therein with departing from the spirit of the invention and having thus described my invention what I claim is.

1. A readily separable coupling for joining together a pair of pipes, each having a cross sectionally arcuate circumferential groove defined in the exterior surface thereof adjacent one end, comprising:
   a cylindrical body having a pair of open ends, each receiving one of said pair of pipes,
   a pair of circumferentially tapered channels, each located on the inner surface of one of said open ends and having a tapered side wall and a perpendicular back wall, said tapered side wall arranged so that the smallest diameter of each of said tapered channels is located at said open end of the cylindrical body, said back walls being integral with said cylindrical body and located at the other ends of said tapered channels, said side walls tapering from said back walls to said open ends, said tapered side walls being spaced apart from the pipe exterior surfaces to define first gaps adjacent said open ends and second gaps adjacent said back walls with said second gaps being larger than said first gaps; a pair of contractible resilient cross sectionally round split rings, each positioned within one of the circumferential grooves and having a relaxed inside diameter less than the outer diameter of said pipes whereby said split rings may be securely seated in the grooves when positioned therein, said split rings having a thickness greater in size than said first gaps but smaller in size than said second gaps, said second gaps having a diameter which is greater than the diameter of the pipe and the split ring thereon, said split rings each being unconstrained within said tapered channels to be free to move inwardly thereof toward said back walls when the pipes are moved in that direction whereby said rings are freed from contact with said tapered walls; split ring unlocking means arranged for operation when said pipes are moved inwardly of said coupling acting to move said cross sectionally round split rings substantially out of the circumferential grooves, said means comprising a partial sleeve member for partially surrounding one of the pipes, a handle on said sleeve member for moving said sleeve member longitudinally of said pipes, said sleeve member sized to fit through said first gaps to move inwardly of said coupling for insertion between one of said split rings and the pipe exterior surface so as to disengage said one split ring from the pipe to free the pipe from the coupling; and sealing means in said coupling comprising annular grooves in the inner surface of the coupling located inwardly thereof with respect to the circumferentially tapred channels and resilient gaskets retained in said annular grooves for sealing engagement with said pipes.

2. The separable coupling set forth in claim 1 and wherein said sleeve corresponds in size and shape with a substantial area of the exterior of a pipe.

3. The coupling of claim 1 and wherein one end of said partial sleeve is tapered.

4. The separable coupling set forth in claim 1 and wherein a threaded opening is located inwardly of the ends of said coupling and arranged for the reception of a fluid conducting device.

5. A readily separable coupling for joining together a pair of pipes, each having a cross sectionally arcuate circumferential groove defined in the exterior surface thereof adjacent one end, comprising:
   a cylindrical body having a pair of open ends, each receiving one of said pair of pipes,
   a pair of circumferentially tapered channels, each located on the inner surface of one of said open ends and having a tapered side wall and a perpendicular back wall, said tapered side wall arranged so that the smallest diameter of each of said tapered channels is located at said open end of the cylindrical body, said back walls being integral with said cylindrical body and located at the other ends of said tapered channels, said side walls tapering from said back walls to said open ends, said tapered side walls being spaced apart from the pipe exterior surfaces to define first gaps adjacent said open ends and second gaps adjacent said back walls with said second gaps being larger than said first gaps; a pair of contractible resilient cross sectionally round split rings, each positioned within one of the circumferential grooves and having a relaxed inside diameter less than the outer diameter of said pipes whereby said split rings may be securely seated in the grooves when positioned therein, said split rings having a thickness greater in size than said first gaps but smaller in size than said second gaps, said second gaps having a diameter which is greater than the diameter of the pipe and the split ring thereon, said split rings each being unconstrained within said tapered channels to be free to move inwardly thereof toward said back walls when the pipes are moved in that direction whereby said rings are freed from contact with said tapered walls; split ring unlocking means arranged for operation when said pipes are moved inwardly of said coupling acting to move said cross sectionally round split rings substantially out of the circumferential grooves, said means comprising an arcuate body, a plurality of spaced elongated members mounted thereon arranged for movement longitudinally of said pipes, said elongated members sized to fit through said first gaps to move inwardly of said coupling for insertion between one of said split rings and the pipe exterior surface so as to disengage said one split ring from the pipe to free the pipe from the coupling; and sealing means in said coupling comprising annular grooves in the inner surface of the coupling located inwardly thereof with respect to the circumferentially tapered channels and resilient gaskets retained in said annular grooves for sealing engagement with said pipes.

6. The coupling of claim 5 and wherein one end of said plurality of elongated members is tapered.

* * * * *